May 18, 1948.  W. H. SCHNEIDER  2,441,599
COLLET
Filed May 24, 1945

INVENTOR.
William H. Schneider
BY Louis O. French
Attorney

Patented May 18, 1948

2,441,599

UNITED STATES PATENT OFFICE 2,441,599

COLLET

William H. Schneider, Milwaukee, Wis.

Application May 24, 1945, Serial No. 595,548

4 Claims. (Cl. 279—55)

The invention relates to collets used on lathes, turret lathes, hand and automatic screw machines for clamping work to the drive spindle of such machines.

One object of the invention is to provide a collet which is easier and cheaper to manufacture than the usual or standard one piece spring collet and can be made of less expensive materials.

A further object of the invention is to provide a collet of very short length and in which the collet sections are uniformly spread by spring means acting on the approximate center portions of the sections. This method of spreading the collet sections or segments promotes uniform wear on the taper and work contacting surfaces of the collet and results in greater accuracy during the life of the collet.

A further object of the invention is to provide a collet which for holding polygonal, such as square, hexagonal or octagonal work or any odd shaped bar work can be accurately ground by grinding the individual segments after these segments have been separated from the machined, hardened and externally ground collet blank.

A further object of the invention is to provide a collet that may be readily adapted to machines now using the standard one piece collet by using an adapter sleeve back of the collet to make up the necessary length between the drawbar and the collet. In instances where the machine spindle nose interior space is limited, a shortening of the collet length and the modified form of spring will readily adapt the collet to this use.

The invention further consists in the several features hereinafter described and more particularly defined by claims at the conclusion hereof.

Figure 1:
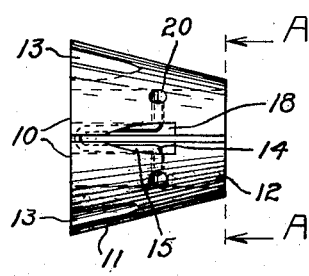
Fig. 1 is a side elevation view of a collet embodying the invention.
Figure 2:
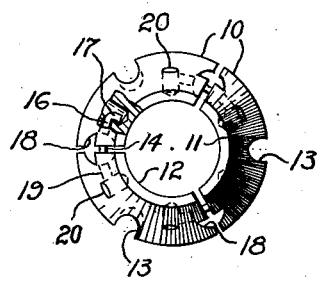
Fig. 2 is an end elevation view looking from the line A—A in Fig. 1.
Figure 3:
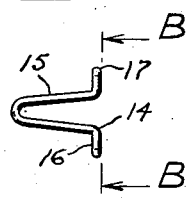
Fig. 3 is a plan view of one of the spreader springs.
Figure 4:
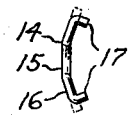
Fig. 4 is an end view of the spreader spring.

Referring to Figs. 1 to 4, the collet embodying the invention is formed of a plurality of separate segments or sections 10, each having an outer tapered surface 11 to fit the tapered bore in the spindle or holder of the machine in which the collet is to be used and each having a hole or work engaging internal surface 12. In the case of round work the surfaces 12 of the assembled sections form a round hole or bore and for polygonal shaped work the surfaces 12 are shaped so that the hole forms a counter-part of the shape of the work or bar to be gripped by the collet. In case the holder of the collet is equipped with driving pins each collet section is provided with a groove 13 to receive one of these pins.

Figure 5:
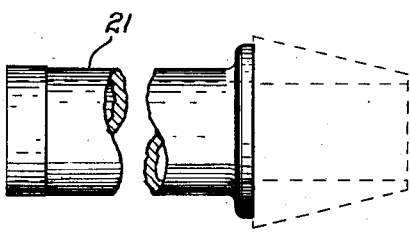
Fig. 5 is an elevation view of the collet and adapter.
Figure 6:
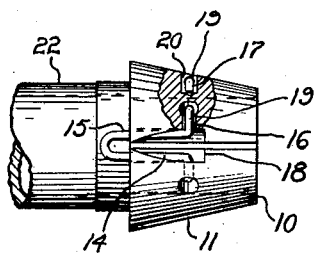
Fig. 6 is an elevation view of a modified form of collet and adapter, parts being broken away and parts being shown in section.

The sections 10 are spread apart by spreader springs 14. Each of these springs includes a U-shaped portion 15 provided with angularly disposed feet or anchoring ends 16 which have inwardly bent toes 17. Bores 18 extend from the base of adjacent collet sections inwardly to a point beyond the central part of the collet to provide spreader spring receiving pockets, and holes 19 extend therefrom and at right angles thereto and communicate with radially drilled holes 20. The holes 19 and 20 are in the central portion of the collet and the springs 14 have their U or bowed portions 15 loosely mounted in the bores 18 and their feet mounted in the holes 19 and their toes 17 bent radially inwardly in the holes 20 from the dotted line position to the full line position shown in Fig. 4 to hold the collet sections in assembled relation. In making the collet, the sections 10 form parts of a one piece blank with the bores 18, holes 19 and holes 20 formed therein before the sections are separated by sawing.

Where the collets are to be used with a push type draw bar and in place of the standard one piece spring jaw collet, I provide an adapter 21 which is a flanged or headed sleeve that takes up the space between the drawbar and the base of the collet, as shown in Fig. 5.

Where in some instances the taper heads of the usual collets are very short, I make the collet sections 10 to correspond with the head length of the usual collet and use an adapter or spacer 22 similar to the adapter 21 but with a smaller diameter head and so that the U-shaped or bowed portions 15 of the spreader springs 14 may project out beyond the base of the collet, as shown in Fig. 6. Instead of allowing the springs 14 to project beyond the base and still use collet sections of very short lengths, I may use the construction shown in Fig. 8 in which the spring receiving pockets 23 are made wider than the bores 18 and the spreader spring has a large eye or bowed portion 24 to get the desired spring action.

Figure 7:
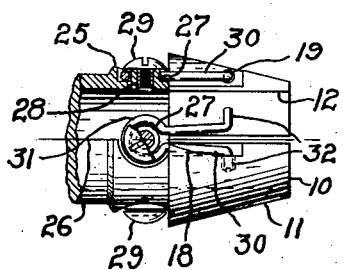
Fig. 7 is a view of another modification, shown partly in elevation and partly in section.

In using the collet with an adapter, instead of providing spreader springs for each collet, the construction shown in Fig. 7 may be used where one set of spreader springs may be used with different sizes or forms of collets. This is accomplished by providing the abutting end 25 of the adapter 26 with spring centering bosses 27 having threaded bores 28 to receive spring retainer screws 29 and forming the spreader springs 30 with eyed portions 31 and straight or toeless feet 32 to engage in the holes 19 of the collet sections 10.

Figure 9:
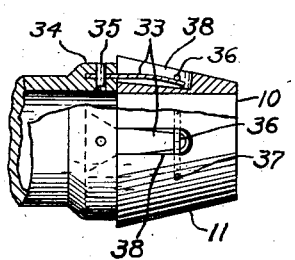
Fig. 9 is an elevation view of another modification, parts being broken away and parts being shown in section.

As a further modification, instead of using wire springs, the spreader springs 33 may be formed of flat spring stock as shown in Fig. 9 with one of their ends anchored to the abutting end of the adapter 34 by pins 35 and their other ends engaging pins 36 mounted in holes 37 in the collet segments 10 which in this case have open recesses 38 to receive the spreader springs.

Figure 8:
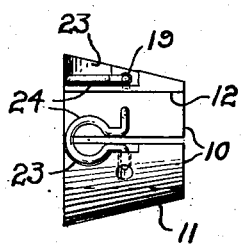
Fig. 8 is an elevation view of another modification.

In the forms shown in Figs. 7 to 9 the complete collet is formed of four segments and is used for square or octagonal bar work. For round or hexagonal work the collet may be formed of three complementary sections.

For round bar work the collet blank is a single piece of metal machined, drilled and almost cut through at the divisions between the sections, then hardened and ground to finished size both externally and internally before breaking the sections apart to form separate sections.

For polygonal shaped bar work the collet blank is a single piece of metal machined, drilled and almost cut through at the divisions between the sections, then hardened and ground to finished external dimensions before breaking the sections apart. After the sections are broken apart, the interior surface of each section is ground by lengthwise transverse of the wheel to bring this surface to the desired finished size, so that when the sections are assembled together, the interior surface will accurately conform to the shape of the bar to be held, something that is not possible with the usual one piece spring collet for square, hexagonal, or other polygonal stock.

In all forms of the invention it will be noted that the spreader springs engage the central portions of the collet sections, and this results in an even spreading of the section and a uniform pressure and wear on the taper and work surfaces.

The collet embodying the invention is easier and cheaper to make than the standard spring collet, requires less material, and if a spreader spring should break, it can be replaced at slight cost as against total loss of the standard collet, and it has the further advantage that odd shapes may be ground to accurate form. It may also be used with an adapter in those machines using the standard one piece collet.

I desire it to be understood that this invention is not to be limited to any particular form or arrangement of parts except in so far as such limitations are included in the claims.

What I claim as my invention is:

1. In a collet, the combination of a plurality of separate sections having complementary tapered external surfaces and internal surfaces formed to fit the shape of the work to be clamped, said sections having rearwardly extending spring receiving pockets formed by complementary recesses in adjoining sections, and spreader springs mounted in said pockets exteriorly of said internal surfaces and any work that may be inserted therethrough and extend rearwardly therefrom, said springs engaging the central portions of the collet sections to hold them in assembled relation and extending rearwardly and lengthwise of said sections at the sides thereof.

2. In a collet, the combination of a plurality of separate sections having complementary tapered external surfaces and internal surfaces formed to fit the shape of the work to be clamped, said sections having rearwardly extending spring receiving pockets formed by complementary recesses in adjoining sections with holes leading therefrom at an angle thereto at the central portion of the collet, and bowed spreader springs mounted in said pockets exteriorly of said internal surfaces and any work that may be inserted therethrough and extend rearwardly therefrom, said springs having angled ends engaging in said holes and their bowed portions extending rearwardly at the sides of said sections.

3. In a collet, the combination of a plurality of separate sections having complementary tapered external surfaces and internal surfaces formed to fit the shape of the work to be clamped, said sections having rearwardly extending spring receiving pockets formed by complementary recesses in adjoining sections and having anchoring holes leading therefrom at the central portions of the collet, spreader springs having bowed portions mounted in said pockets, exteriorly of said internal surfaces and any work that may be inserted therethrough and extend rearwardly therefrom, and extending rearwardly at the sides of said sections and feet and toe portions mounted in said holes, said toe portions holding the collet sections together as a unit.

4. In a straight through collet, the combination of a plurality of separate sections having complementary tapered external surfaces and internal surfaces formed to fit the shape of the work to be clamped, said sections having rearwardly extending spring receiving pockets formed by complementary recesses in adjoining sections and having holes leading therefrom at an angle thereto at the central portion of the collet, and bowed spreader springs mounted in said pockets exteriorly of said internal surfaces and any work that may be inserted therethrough and extend rearwardly therefrom with their ends engaging in said holes and with their bowed portions extending rearwardly at the sides of said sections, a hollow sleeve adapter abutting the rear end of the collet, and means for anchoring portions of the bowed portions of the springs on the end of the adapter abutting the collet.

WILLIAM H. SCHNEIDER.

REFERENCES CITED

The following references are of record in the file of this patent:

UNITED STATES PATENTS

| Number | Name | Date |
| --- | --- | --- |
| 141,345 | Goodell | July 29, 1873 |
| 594,587 | Almond | Nov. 30, 1897 |
| 660,121 | Parsons | Oct. 23, 1900 |
| 693,256 | Furbish | Feb. 11, 1902 |
| 758,761 | Littleton | May 3, 1904 |
| 1,069,430 | Jensen | Aug. 5, 1913 |
| 1,095,672 | Quinlan | May 5, 1914 |
| 1,679,299 | Fegley et al. | July 31, 1928 |
| 2,018,452 | Laughlin | Oct. 22, 1935 |